United States Patent [19]

Dixit et al.

[11] Patent Number: 5,287,637
[45] Date of Patent: Feb. 22, 1994

[54] APPARATUS TO DRY/HEAT TREAT CONTINUOUS WEB STOCK OF FILM

[75] Inventors: Thuan P. Dixit, Midland; Paul T. Louks, Saginaw, both of Mich.

[73] Assignee: The Dow Chemical Company, Midland, Mich.

[21] Appl. No.: 859,177

[22] Filed: Mar. 27, 1992

[51] Int. Cl.$^5$ .............................................. F26B 13/00
[52] U.S. Cl. ........................................ 34/158; 34/162; 226/173
[58] Field of Search .................. 34/158, 162, 155; 226/52, 173

[56] References Cited

U.S. PATENT DOCUMENTS

| | | | |
|---|---|---|---|
| 1,999,587 | 4/1935 | Davis | 34/162 |
| 2,034,716 | 4/1936 | Dreyfus | 18/57 |
| 2,334,022 | 8/1940 | Minich | 18/57 |
| 2,473,404 | 7/1940 | Young | 18/1 |
| 2,618,012 | 5/1948 | Milne | 18/1 |
| 3,160,340 | 12/1962 | Menkel | 226/53 |
| 3,171,873 | 3/1965 | Fikentscher et al. | 34/158 |
| 3,240,412 | 3/1966 | Zygan et al. | 226/88 |
| 3,323,703 | 6/1967 | Wibbing et al. | 226/173 |
| 3,371,428 | 3/1968 | Thygeson, Sr. et al. | 34/158 |
| 3,571,846 | 1/1969 | Tomlinson et al. | 18/1 |
| 3,743,474 | 7/1973 | Brock | 432/8 |
| 4,104,769 | 8/1978 | Levy et al. | 26/92 |
| 4,536,365 | 9/1985 | Zwick | 264/558 |
| 4,862,564 | 9/1989 | Kwack | 26/89 |
| 4,866,957 | 9/1989 | Daniel et al. | 68/5 D |
| 5,129,163 | 7/1992 | Yamazaki et al. | 34/158 |

Primary Examiner—Henry A. Bennett
Assistant Examiner—Denise L. Gromada
Attorney, Agent, or Firm—Margaret M. Brumm

[57] ABSTRACT

An apparatus for the constrained drying and/or heat treating of a continuous or roll of, web stock of film. This apparatus includes a mechanism which grasps a film by its edges and moves said film through a drying zone, with said mechanism holding said film taut without substantial stretching of said film in the drying zone, and a means to remove the evaporated solvent from said apparatus. The apparatus is particularly useful for drying film of polybenzoxazole, polybenzothiazole and copolymers thereof, as well as molecular composite films. A method of drying/heat treating film is also disclosed.

17 Claims, 7 Drawing Sheets

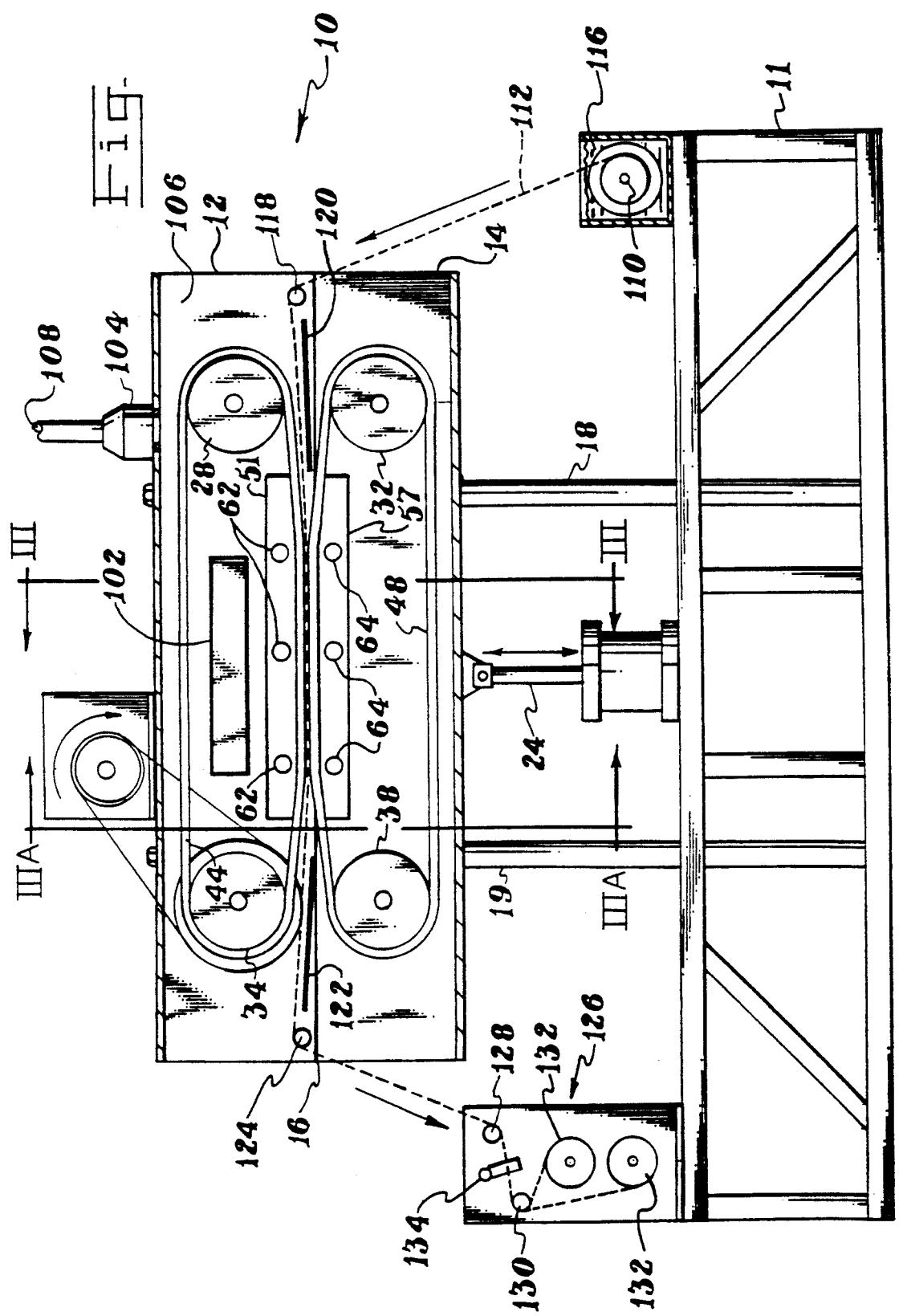

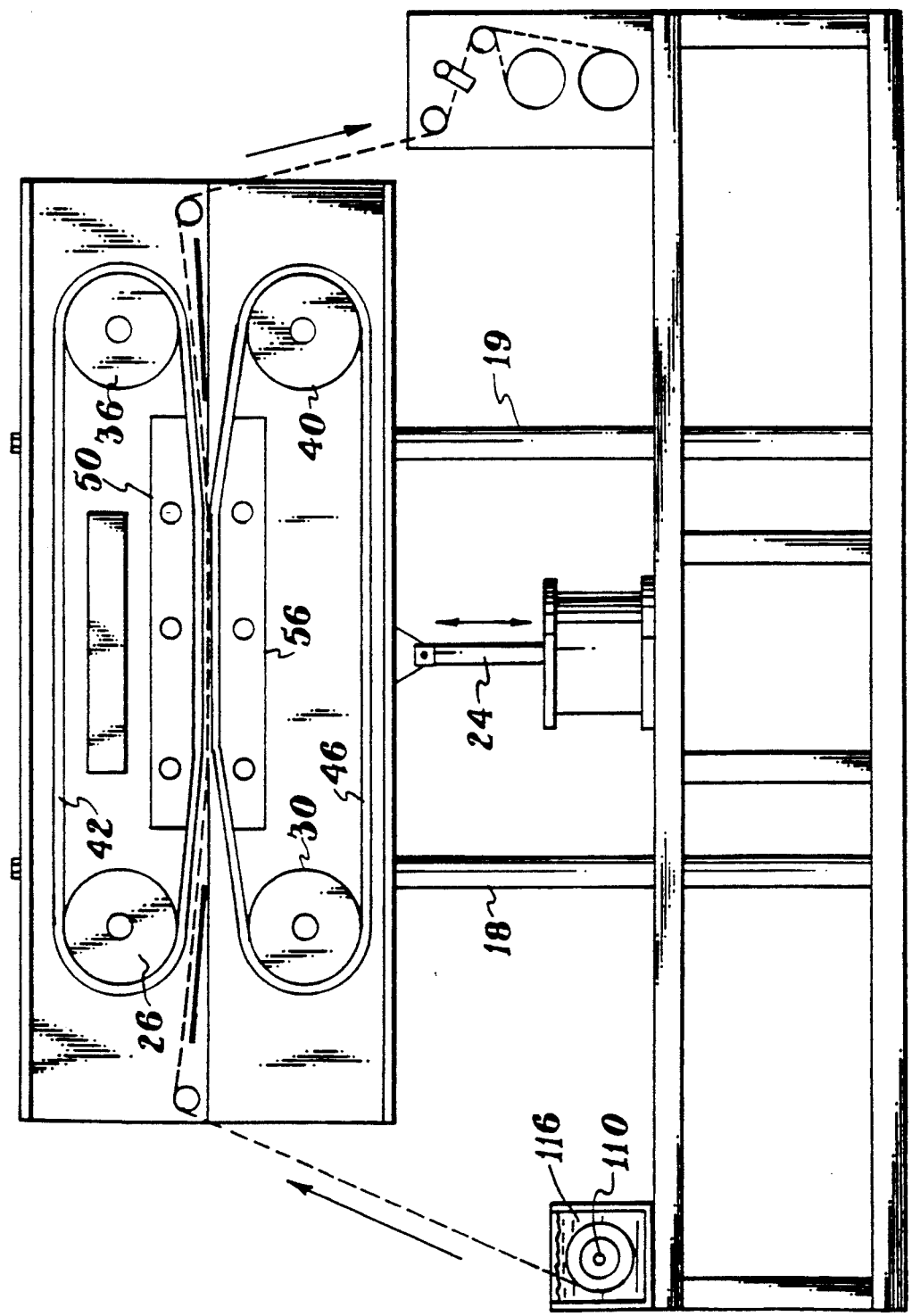

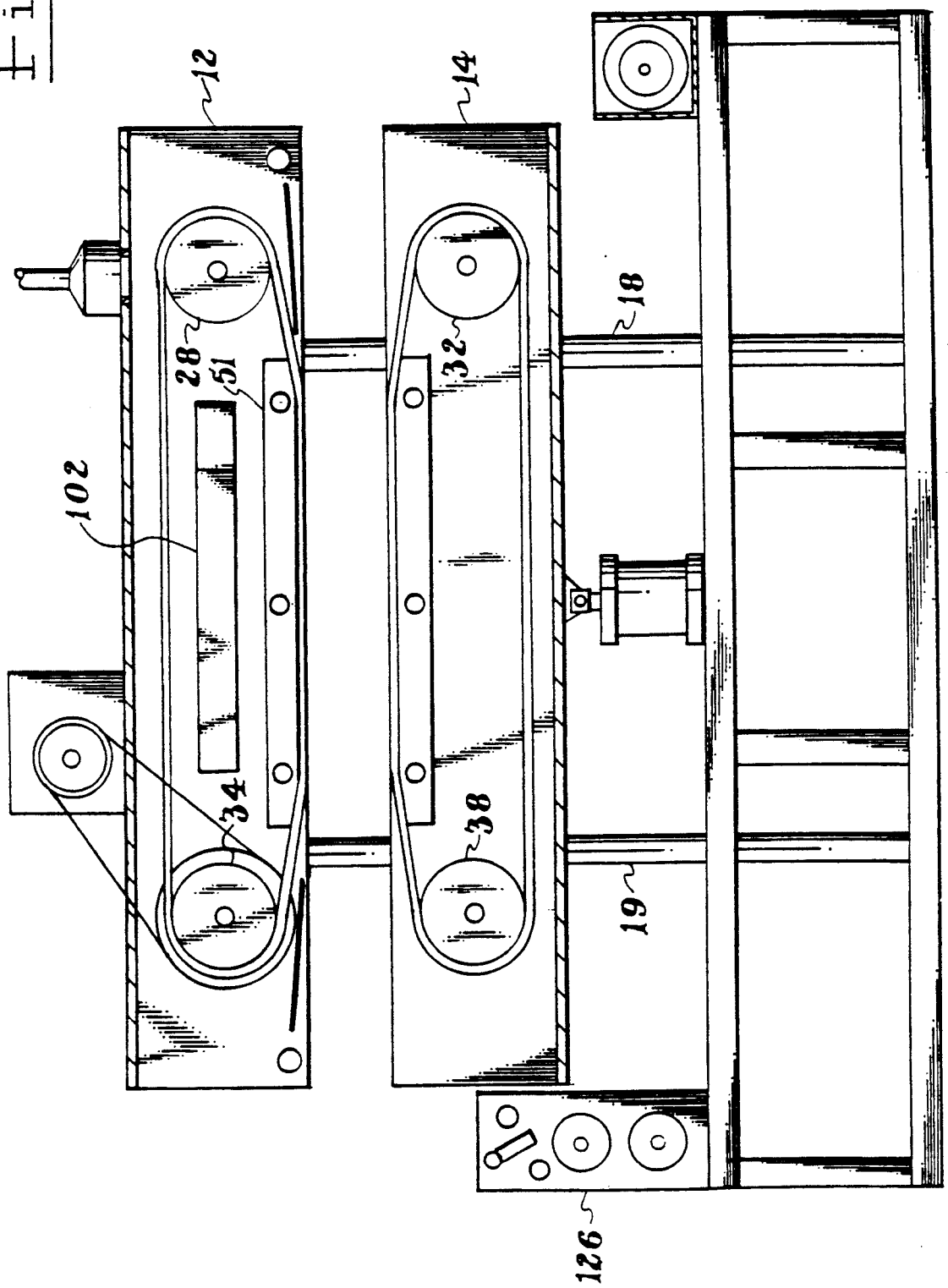

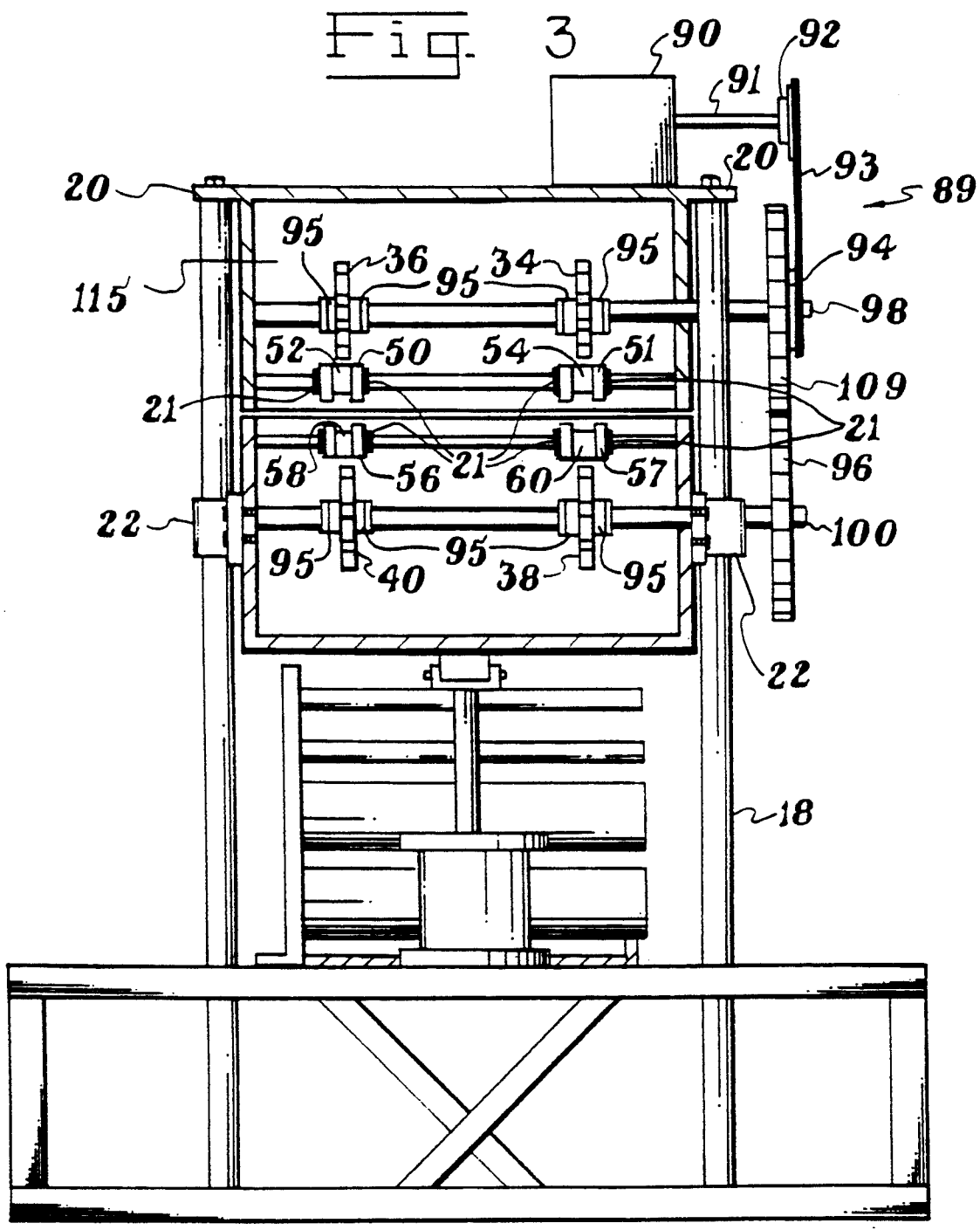

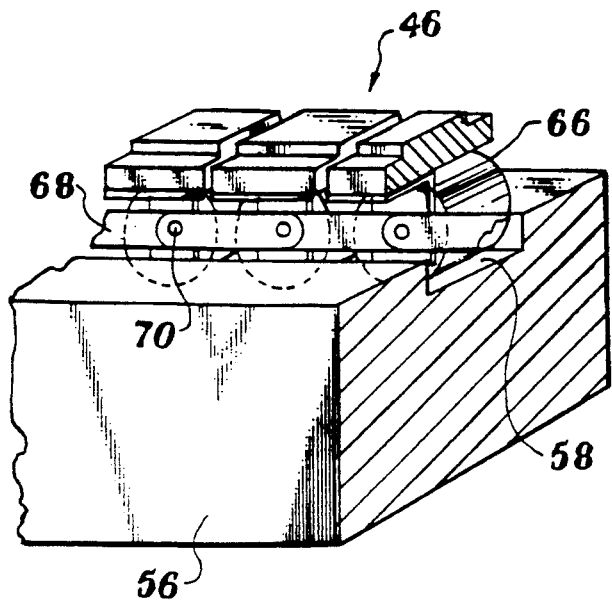
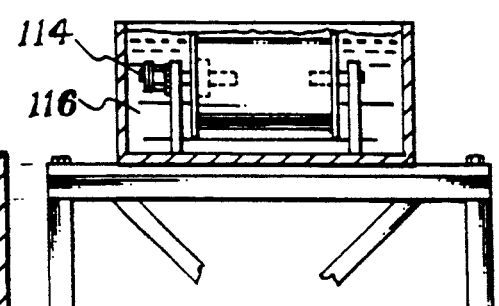
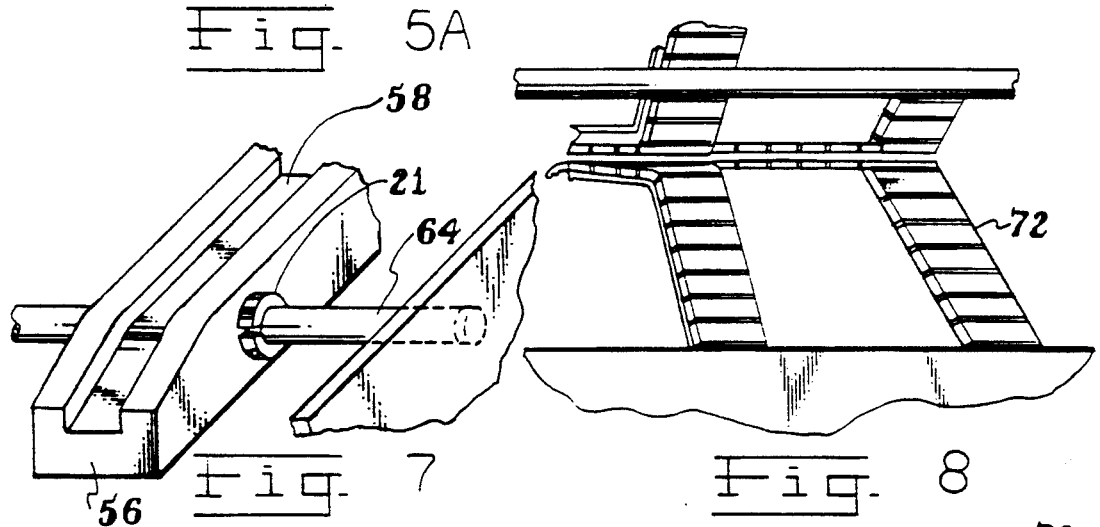
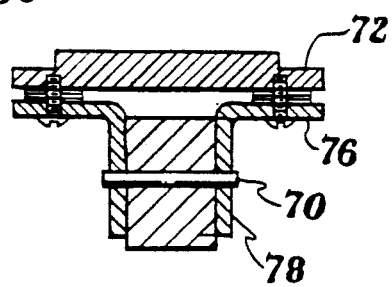
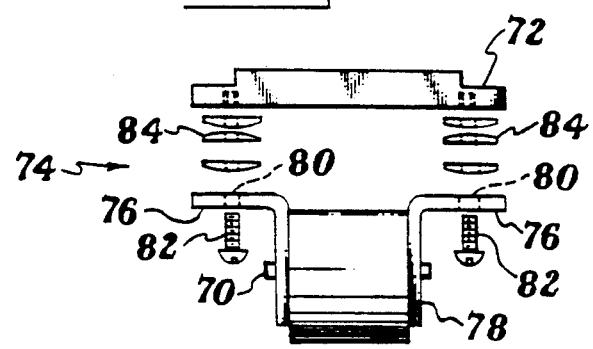

APPARATUS TO DRY/HEAT TREAT CONTINUOUS WEB STOCK OF FILM

This invention was made with Government support under government contracts F33615-86-C5068, F49620-86-C-0057 and F533615-85-R-5090 awarded by the United States Air Force. The United States government has certain rights in this invention.

BACKGROUND OF THE INVENTION

This invention relates to the constrained drying and/or heat treatment of a continuous web stock of film.

In the production of continuous rolls of film it is sometimes necessary to separate the film from its solvent. This separation process is known as drying of the wet film. Drying of wet film often causes the film to shrink. As this shrinkage is normally undesirable, it is necessary to constrain the drying film so that it retains a usable shape. Another process step in the production of continuous rolls of certain types of film is to heat treat a dry film to improve certain of the film's properties. Heat treatment may also result in film shrinkage. In order to dry and/or heat treat a roll of continuous film it is necessary to be able to move the roll of film in a continuous, non-interrupted manner.

Current equipment that exists to handle ("handle" meaning to move or to dry or to stretch or to heat treat) continuous rolls of film or other web stock materials involve either intricate and/or expensive clamping means to hold the film (U.S. Pat. No. 3,571,846) or a gripping means that involves puncturing the film (U.S. Pat. No. 3,160,340). U.S. Pat. No. 3,240,412 describes an arrangement for moving tensioned webs of foil where the foil has flanged edges.

There is a need for a simple, inexpensive apparatus for the drying and/or heat treating of a continuous web stock of film (with up to 99% solvent in the wet film) while the film is in an unpunctured and constrained, though unstretched, state.

SUMMARY OF THE INVENTION

The present invention is an apparatus for exposing a continuous, or roll of film to a heated gas comprising:
a) a mechanism which grasps a film by its edges and moves said film through a drying zone, with said mechanism holding said film taut without substantial stretching of said film in the drying zone, and
b) a means to remove the evaporated solvent from said apparatus.

An inexpensive apparatus is disclosed suitable for drying and or heat treating a continuous or roll of wet, up to 99% solvent, film stock. This film dryer does not require that the film be punctured in order for it to be dried. For a dry film, this film drying apparatus could be used to heat treat the film.

DESCRIPTION OF THE DRAWINGS

FIG. 1 is a side cross-sectional view of the apparatus in the closed position.

FIG. 1a is a opposite angle side cross-sectional view of the apparatus in the closed position.

FIG. 2 is a side cross-sectional view of the apparatus in the open position.

FIG. 3 is a cross-sectional view of the apparatus taken along section line III (in the direction of the arrows) in FIG. 1.

FIG. 4 is an end cross-sectional view of the supply bath and friction clutch assembly.

FIG. 5 is a close-up view of conveyor chain 46 fitting in groove 58 of rail 56.

FIG. 5A is a perspective view of rail 56, support bar 64 and clamp collar 21.

FIG. 6 is a close-up view of the upper 42, 44 and lower 46, 48 conveyor chains and pressure plates 72 coming together.

FIG. 7 is a cross-sectional view of the conveyor chain-pressure plate assembly.

FIG. 8 is an exploded cross-sectional view of the conveyor chain-pressure plate assembly.

DETAILED DESCRIPTION OF THE PREFERRED EMBODIMENT

Figure 3A:
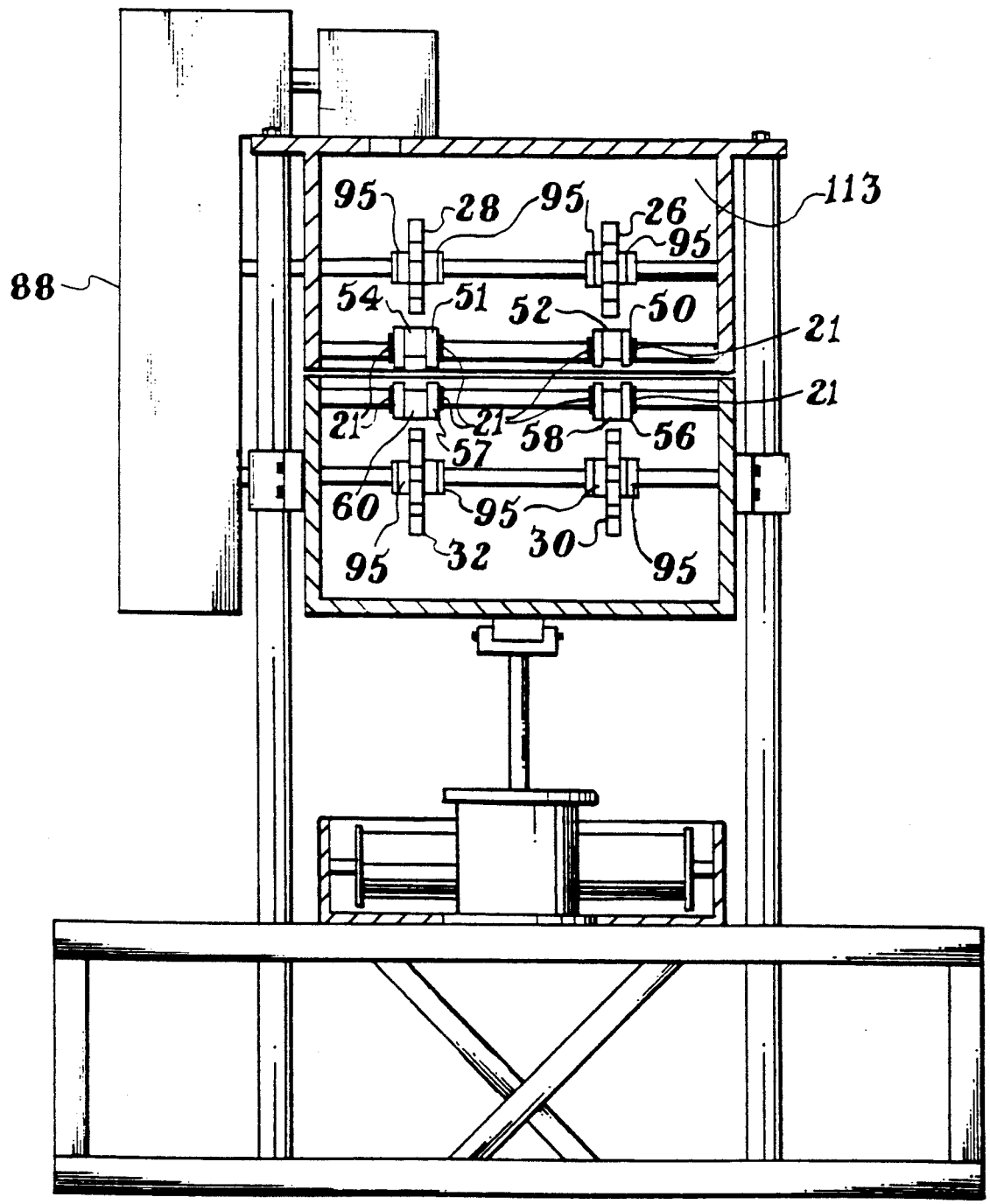
FIG. 3A is a cross-sectional view of the apparatus taken along section line IIIA (in the direction of the arrows) in FIG. 1.

The present invention is a film drying apparatus comprising a mechanism which grasps a film by its edges and moves said film through a drying zone, with said mechanism holding said film taut without substantial stretching of said film in the drying zone, a heating element to provide heat in said drying zone, a means to create a gas flow suitable to remove evaporated moisture or solvent from the film without penetrating the film, and a means to remove the evaporated solvent from said film drying apparatus.

The apparatus is designed to dry films with a high solvent content. This solvent may be water or any other typical solvent used in film processing. A typical film that is dried in this film dryer contains about 1-99% solvent. More preferably the film contains about 10-95% solvent and the most preferred solvent content in the wet film is about 80-95%. Of course, the less the solvent content of the film, the easier it is for the film drying apparatus to dry the film. Should the wet film have a very low solvent content, or if a dry film is run through the film dryer, this film drying apparatus can be used to heat treat such films. With a sufficient residence time of the film in the apparatus, wet film can be moved through the apparatus and both dried and heat treated on one pass.

Film usually must be constrained as it dries to prevent shrinkage, because shrunken film does not have a usable shape. The apparatus provides a continuous means of restraining the film in the linear and axial dimensions to prevent shrinkage on drying or heat treatment.

This apparatus has the capability of handling many different types of "wet" film that require drying and/or heat treating. These film types include polybenzoxazole, polybenzothiazole, polybenzimidazole and various copolymers of these polymers. In addition to the azole based films, this apparatus can dry what are known as molecular composite films which are films made up of block and random copolymers of differing compositions. If desired, almost any type of thermoplastic film, such as polyethylene, polystyrene, or polycarbonate, could be dried in this apparatus. Furthermore, this film dryer is designed such that it could dry a "web stock" material such as cloth or other textile based materials.

The films being dried in this apparatus may be porous or non-porous. The apparatus is particularly useful for drying non-porous film because the apparatus is designed to use hot gas to dry a film, without having the gas penetrate the film. Porous films dried in this apparatus must have sufficient cohesiveness in their structures to withstand the rigors of constrained drying.

The speed at which the film is moved through the film drying apparatus is known as the line speed. The operable line speed is a function of many variables, including thickness and porosity of the film, temperature in the drying zone, vapor pressure of the solvent to be removed and ventilation rate of the solvent-laden gas in the dryer. Two of the most critical variables are temperature in the drying zone and the vapor pressure of solvent removed. These two variables define the minimum residence time a wet film must stay in the drying zone for complete solvent removal. Maximizing line speed is a desirable goal because the faster the line speed, the shorter the residence time of the film in the apparatus and the shorter the residence time the lower the costs to produce a dried film. A higher drying temperature in the drying zone will permit a faster line speed. A volatile solvent will evaporate faster than a solvent with low volatility so the more volatile the solvent being removed, the faster the line speed can be.

The mechanism which grasps the film by its edges preferably moves the film at line speeds of from 1 cm/minute to 250 meters/minute. The line speed of operation is more preferably from 1 meter/minute to 5 meters/minute and the most preferred speed is ½ meter/minute. The mechanism may have a gripping means that punctures the film. However, it is preferable that the gripping means does not puncture the film as any puncture of a shrinkable material could lead to tearing or creasing of the remaining film as the constrained film shrinks. In normal operation the gripping means would hold the film in a constrained, though unstretched form.

A heating element is used to heat the wet film. The heating unit must be able to operate at a temperature capable of driving moisture and/or solvent from the film. Any known type of heating element, from gas flame to standard convection oven may be used. The most preferred type of heating element is a standard infrared heater. Of course if the solvent in the film is flammable, the heating element must be selected so that there is no danger of explosion or fire. The heating unit preferably is capable of achieving temperatures from 100°-871° C. A preferred operating temperature range for the heating unit is from about 150°-343° C. and the most preferred operating temperature for the heating unit is about 200° C. When the heating unit is being used to heat treat film, the operating temperature, depends upon the film being so treated. For example, polybenzoxazole film is typically heat treated at about 500°-600° C.

This heating element may be positioned inside or outside the film drying apparatus. If positioned outside the apparatus, there is provided a means to convey the thermal energy of the heating element via a gas from the heating element to the inside of the apparatus. If positioned inside the apparatus the location for the heating element may be on the top, bottom or sides of the apparatus. Only one heating element is necessary provided there is sufficient circulation of heated gas above and below the wet film. Heated gas circulation is necessary in order to dry both sides of the film as by means of a blower and/or convection. To prevent premature unconstrained drying of the film with concomitant shrinkage the film is not heated until it is restrained at the edges. The drying zone is defined as that portion of the apparatus wherein the film is exposed to heated gas.

The heated gas can be any gas capable of carrying moisture or solvent such as $N_2$, Air, or $CO_2$. Preferably the gas is air and most preferably ambient air. If any gas other than air is used, a means to exclude the atmosphere from the drying zone must be added to the machine.

When the film is in the drying zone the elevated temperatures cause the solvent in and on the film to evaporate. Once evaporated, the solvent exits the drying chamber. This evaporation causes a steady increase in the level of solvent-laden gas in the drying zone. As the goal of the film drying apparatus is to produce dried film it is undesirable to allow this solvent laden atmosphere to circulate over the drying and dried film. Therefore, a means to remove the solvent laden atmosphere from the film drying apparatus must be provided. A preferred means to do this is to provide for venting of the inside of the film drying apparatus. This venting could include a vent from the inside of the film drying apparatus to the outside of the film drying apparatus. It could also include the ports at either end of the film drying apparatus. If the evaporating fluid is water, it is allowed to exit into the atmosphere. If it is a (non-aqueous) solvent, it is allowed to condense and be collected in supportive equipment.

The film drying apparatus should be able to accommodate wet films of varying thicknesses between 1 and 10,000 microns. The most preferred thickness for wet films is 100-1000 microns (4-40 mils or 0.004-0.04 inches). Once dry, films will usually have a reduced thickness as a result of solvent loss from the wet film. The final thickness of the dried film depends on the solvent content of the wet film prior to the film being dried. If the film is porous, final film thickness also depends on pore size.

The film dryer can accommodate films of varying widths, with a minimum width of 2.54 cm (1 inch) and no real practical limit on the maximum width. Films wider than 3.66 meters may sag between the edges. Film sagging may cause a loss of film shape and finished properties. Wide films may require one or more center supports for the wet film as it moves through the dryer in order to prevent undesirable sagging.

Alternatively, the apparatus may be oriented such that plane 16 is vertical with respect to the floor plane.

A preferred embodiment of the film dryer apparatus is shown in FIGS. 1-9. Side cut-away views of the apparatus are shown in FIGS. 1, 1A and 2. End cut-away views of the apparatus are shown in FIGS. 3 and 3A.

Film dryer 10 operates with wet film 112 entering the dryer and being conveyed through it by endless chains. Pressure plates 72 on opposing endless chains grip the film and prevent it from shrinking as the elevated temperatures caused by heating unit 102 dry the film.

Film dryer 10 is supported by frame 11. Film dryer 10 has a fixed carriage 12 and a movable carriage 14 which come together at plane 16. Fixed carriage 12 is permanently affixed to ways 18 and 19 via beam 20. Movable carriage 14 moves on ways 18 and 19. The positions of the fixed and movable carriages in a horizontal orientation of plane 16 could be reversed (i.e. the movable carriage could be on the top and a means to lower it onto the fixed carriage below and lift it off the fixed carriage below would also be provided for). Linear bearings 22 enable movable carriage 14 to move on ways 18 and 19. Movable carriage 14 is lifted up and down by actuator 24. Actuator 24 can be any machine capable of raising and lowering movable carriage 14, such as a pneumatic or hydraulic lift. Actuator 24 typically is made up of an air cylinder with a regulator to set the amount of pressure the actuator provides in closing movable carriage to fixed carriage.

Film dryer 10 has means for admitting ambient air into the dryer. These air entry means may include appropriately sized inlet 113 and exit 115 ports. Air access means may include additional entry ports located around the periphery. These air entry ports may or may not need to be controllable.

Inside fixed carriage 12 are upper conveyor chain sprockets 26, 28, 36, and 34. Upper conveyor chain 42 runs endlessly around upper conveyor chain sprockets 26 and 36. Upper conveyor chain 44 runs endlessly around upper conveyor chain sprockets 28 and 34.

Inside movable carriage 14 are lower conveyor chain sprockets 30, 32, 40 and 38. Lower conveyor chain 46 runs endlessly around lower conveyor chain sprockets 30 and 40. Lower conveyor chain 48 runs endlessly around lower conveyor chain sprockets 32 and 38.

The sprockets are movable on their respective axles to accommodate films of varying widths. Upper chain sprockets 34, 36 and 28, 26 are movable axially on axles 98 and 99 respectfully. Lower chain sprockets 38, 40 and 32, 30 are similarly movable on their respective axles 100 and 101. Tapered locking bushings 95 or equivalent means hold each sprocket in place on its axle. As seen in FIGS. 1-3A When adjusting the position of each sprocket on its axle, it is important to line up the sprockets in a vertical manner; sprocket 34 lines up with sprocket 38, sprocket 36 lines up with sprocket 40, sprocket 26 lines up with sprocket 30 and sprocket 28 lines up with sprocket 32, otherwise, the film could be stretched and stretched unevenly. (See FIGS. 1-3A.)

Rails 50, 51, 56 and 57 are used to guide the conveyor chains as they move. Rails are visible in FIGS. 3, 3A, 5 and 5A. Upper rail 50 has groove 52. Upper rail 51 has groove 54. Upper conveyor chain 42 runs through groove 52. Upper conveyor chain 44 runs through groove 54. Lower rail 56 has groove 58. Lower rail 57 has groove 60. Lower conveyor chain 46 runs through groove 58. Lower conveyor chain 48 runs through groove 60. In FIG. 5 a detailed view of representative rail 56, with groove 58 cut into it and representative chain 46 running through groove 58 is shown.

Upper support bars 62 support upper rails 50 and 51. Lower support bars 64 support lower rails 56 and 57. Rails 50, 51, 56, and 57 are movable on their respective support bars to accommodate films of different widths. Clamp collars 21 or equivalent means hold the rails in place on their respective support bars. Representative rail 56, with groove 58 cut into it, with the rail being held in place on the support bar 64 by clamp collar 21, is shown in FIG. 5A.

Conveyor chains 42, 44, 46 and 48 are each made up of individual chain rollers 66 (see FIG. 5). These chain rollers 66 are joined together by link 68. Each chain roller 66 is affixed to link 68 by chain unit axle 70. Each individual chain roller 66 has a pressure plate 72 affixed to it via assembly 74 (FIG. 7 and 8). Assembly 74 has, on both sides of individual chain roller 66, a conveyor chain lug 76 affixed to chain unit axle 70 via a conveyor chain bar 78. Conveyor chain lug 76 has holes 80 through which screws 82 fit. Screws 82 are used to fasten pressure plate 72 to conveyor chain lug 76 through screw threads 81 in pressure plate 72. Screws 82 pass through several Belleville springs 84 to cushion pressure plate 72.

Figure 9:
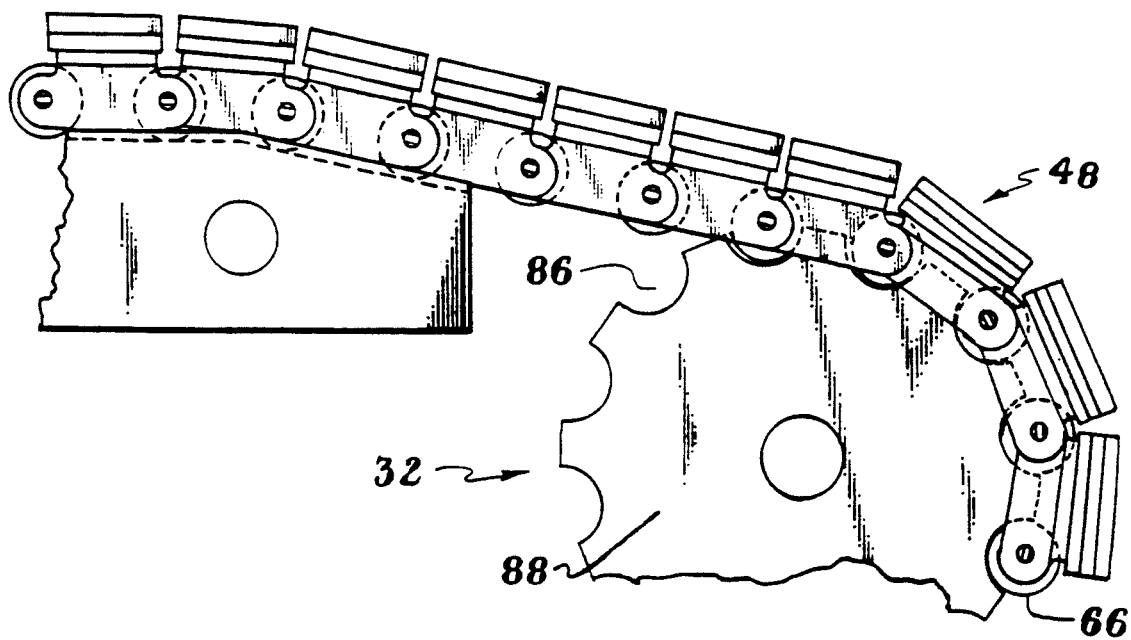
FIG. 9 is a cross-sectional side view of the interaction between conveyor chain 48 and sprocket 32.

FIG. 9 shows how typical conveyor chains interact with conveyor chain sprockets. Individual conveyor chain rollers 66 fit into individual half circles 86 on sprocket wheel 88. As sprocket wheel 88 turns, conveyor chain rollers 66 also turn with it and cause the conveyor chain to move. FIG. 3 and 3A shows a cutaway view of all the sprockets 36, 40 and 34,38 and 28,32 and 26,30 as well as the rail with their grooves that the chains fit in.

FIG. 3 also shows that upper conveyor chain sprockets 34 and 36 are rotated by variable speed drive motor 90 through drive motor shaft 91, drive motor sprocket 92, drive motor chain 93, receiving sprocket 94 and upper axle 98. Drive motor 90, also moves lower conveyor chain sprockets 38 and 40 through the entire drive motor assembly 89 (drive motor assembly 89 includes drive motor shaft 91, drive motor sprocket 92, drive motor chain 93, receiving sprocket 94, gear 109 which meshes with gear 96 driving lower axle 100) which is shown covered by cover 88 in FIG. 3A. . The rotation of sprockets 34, 36, 38 and 40 on axles 98 and 100 causes conveyor chains 42, 44, 46 and 48 to move. Conveyor chain sprockets 26, 28, and 30, 32 are non-driven sprockets.

Fixed carriage 12 is illustrated with heater 102 inside and vent fan 104 linking the inside 106 of film dryer 10 with the outside 108. Heater 102 could also be positioned on the bottom or sides of the inside of film dryer 10. Heater 102 is sized such that it is positioned directly over the section of film dryer 10 where film 112 is secured on both sides by pressure plates 72. The drying zone is created by the heat from heater 102.

Spool 110 holds undried film 112. Undried film 112 is typically stored in a water bath prior to entering the film dryer to prevent unrestrained drying. When film dryer 10 is used to heat treat dried film 136, dried film 136 is not stored in a water bath.

To operate film dryer 10 spool 110 is placed on friction clutch assembly 114 in supply bath 116. Undried film 112 is threaded over film rod 118 (FIG. 1) through inlet port 113 and over film support plate 120 (optional), into the inside 106 of film dryer 10. Dried film 136 leaves film dryer 10 over exit film support plate 122 (optional) through exit port 115 and travels over exit film rod 124 to winder assembly 126. Winder assembly 126 is typically made up of idle roll 128, positioning roll 130 and one or more take-up rolls 132. Slitting blades 134 are positioned so that the edges of dried film 136 are trimmed off inside winder assembly 126. Slitting blades 134 could also be positioned prior to winder assembly 126, so that the edges of the film are removed immediately after the film is released by pressure plates 72.

To use film dryer 10 it first must be moved to its "open" position (FIG. 2) by using actuator 24 to lower movable carriage 14. Wet film 112 is threaded through film dryer 10 onto winder assembly 126. Once wet film 112 is in place inside film dryer 10, actuator 24 is used to raise movable carriage 14 up so that it seats with fixed carriage 12 at plane 16. The position of movable carriage 14 can be adjusted to accommodate wet films 112 of varying thicknesses. Upon closing the dryer by bringing movable carriage to plane 16, the pressure plates 72 on upper conveyor chain 42 and lower conveyor chain 46 are aligned on opposite sides of wet film 112 as are the pressure plates 72 on upper conveyor chain 44 and lower conveyor chain 48. (See FIG. 6). The force of the pressure plates 72 on the wet film 112 can be measured and adjusted. When pressure plates 72 move, through the action of drive motor 90 on sprockets 26, 28, 30, 32, 34, 36, 38 and 40 and conveyor chains 42, 44, 46 and 48 they move film 112. As the film is being moved, Belleville springs 84 compensate for any deflections of rails 50, 51, 56 and 57 to maintain gripping pressure on film 112. The suction of vent fan 104 draws air though the dryer. Friction clutch assembly 114 is set to provide enough tension to spool 110 so that when wet film 112 moves, it moves smoothly through film dryer 10. Dried film 136 is taken up evenly on winder assembly 126.

The apparatus of the present invention and the process to use it to dry and/or heat treat specific films is more specifically illustrated in the following examples. These examples are to be taken for illustrative purposes only and not to be taken as limiting in any way, whatsoever.

EXAMPLE 1

DRYING OF A SPOOL OF WET MOLECULAR COMPOSITE FILM.

A roll of wet film having a width of 8 inches (20.32 cm) and a thickness of 20 mils (0.051 cm) is threaded into the apparatus. The wet film is composed of 95 wt % water, 5 wt % (30/70) copolymer of PBO/PEK (PBO polybenzoxazole, PEK=poly ether ketone). The temperature of the air space in the drying zone is 200 degrees centigrade. The line speed of the endless chains holding the clamping pressure plates is 0.32 lineal foot (9–75 lineal cm/minute). The film residence time in the drying zone is 6.3 minutes. The air cylinder pressure in the actuator is 40 psi and the clamping pressure on film edges by the pressure plates in the tracks is 16 psi. The pressure plates clamp the film edges about one inch on each side.

As the moving film web emerges from the drying chamber, it is dry, flat, smooth, glossy and stable. The dry film is then fed onto the film take-up device which moves at the same line speed to maintain the film web tension. A pair of in-line razors trims the dry film edges. The good dry film web having a width of 6 inches (15.24 cm) (the distance spaced between the tracks) and 1 mil thick (25.4 microns) is wound onto the spool. The dry film composition is now 100% solid, composed of 30 wt % PBO and 70 wt % PEK.

EXAMPLE 2

The same experimental setup as in Example 1, but the film line speed is increased to 0.53 lineal feet (16.15 lineal cm/minute). The film residence time inside of the dryer is 3.75 minutes. A good spool of dry PBO/PEK film 6 inches (15.24 cm) wide by 1 mil (0.00254 cm) thick is made.

EXAMPLE 3

The same experimental setup as in Example 2, but the clamping pressure exerted on the wet film edges is increased to 32.5 psi (air cylinder is set at 60 psi). A good spool of dry PBO/PEK film 6 inches (15.24 cm) wide by 1 mil (0.00254 cm) thick is formed.

EXAMPLE 4

Heat Treating A Spool Of PBO Film

A 100% polybenzoxazole (PBO) film is threaded through the apparatus with all the operating parameters set the same as in Example 1, except for the temperature in the drying zone being 600 degrees centigrade. The PBO film is heat treated under constraint which causes film properties such as modulus to increase by about 50% or more.

What is claimed is:

1. An apparatus for exposing a continuous web stock of film which contains a solvent to a heated gas for the purpose of separating the solvent from the film comprising
    a) a mechanism which grasps a film by its edges, with said mechanism being at least two rows of parallel pressure plated on one side of the film and at least two rows of parallel pressure plates on the other side of the film, with said pressure plates on opposite sides of said film being aligned in opposition to each other, and where said mechanism operates to move said film through a
    b) drying zone, wherein said drying zone is created by inclusion of a heating element within the apparatus and with said pressure plates holding said film taut without penetrating the film and without causing substantial stretching of said film in the drying zone, and
    c) a means to remove the solvent which is separated from the film in the drying zone from said apparatus.

2. The apparatus of claim 1 wherein said drying zone is created infusion of heated gas.

3. The apparatus of claim 1 in which said four rows of pressure plates are affixed to endless chains moved via a sprocket-gear-axle linking mechanism to a drive motor, such that when the drive motor is engaged, the chains, and thus the pressure plates move, transporting the film between the pressure plates through the apparatus.

4. The apparatus of claim 1 in which said heating element is positioned directly over the film only where the film is held taut by the opposing rows of parallel pressure plates.

5. The apparatus of claim 2 wherein said heated gas is air.

6. The apparatus of claim 1 wherein said solvent is water.

7. The apparatus of claim 1 which also includes slitting blades positioned such that they remove the edges of the film after the film has been separated from its solvent.

8. A method of separating the solvent from a continuous web stock of film which contains a solvent comprising:
    moving a continuous web stock of film which contains a solvent through the apparatus of claim 1.

9. The method of separating the solvent from a continuous web stock of film of claim 8 wherein said continuous web stock of film which contains a solvent contains at least 80% solvent.

10. The method of separating the solvent from a continuous web stock of film of claim 9 wherein said continuous web stock of film which contains a solvent is a film of a polybenzoxazole or polybenzothiazole polymer or copolymer and wherein the solvent is water.

11. A method of heat treating a continuous web stock of dry film comprising moving a continuous web stock of dry film through the apparatus of claim 1.

12. A polymeric film dried in the apparatus of claim 1.

13. A polymer film heat treated in the apparatus of claim 1 according to the method of claim 11.

14. The polymeric film of claim 12 wherein said film is polybenzoxazole.

15. The polymeric film of claim 13 wherein said film is polybenzoxazole.

16. The polymeric film of claim 12 wherein said film is a molecular composite film.

17. The polymeric film of claim 13 wherein said film is a molecular composite film.

* * * * *